United States Patent [19]
Allen et al.

[11] Patent Number: 5,451,851
[45] Date of Patent: Sep. 19, 1995

[54] METHOD AND APPARATUS FOR ONE WIRE MOTOR SPEED AND DIRECTION DECODING

[75] Inventors: Edward O. Allen, Indianapolis; John M. Schieffer, Kokomo, both of Ind.

[73] Assignee: Delco Electronics Corp., Kokomo, Ind.

[21] Appl. No.: 162,569

[22] Filed: Dec. 6, 1993

[51] Int. Cl.⁶ .............................................. G01P 3/481
[52] U.S. Cl. ...................................... 318/602; 324/165
[58] Field of Search ........................ 318/685, 600–605, 318/615–618, 640, 652, 653, 660, 661; 324/160–175, 207.25; 341/3, 6

[56] References Cited

U.S. PATENT DOCUMENTS

| | | | |
|---|---|---|---|
| 4,074,339 | 2/1978 | Turnbull | 324/165 X |
| 4,199,800 | 4/1980 | Weit | 324/163 X |
| 4,893,085 | 1/1990 | Taruya et al. | 324/378 |
| 5,017,850 | 5/1991 | Harada et al. | 318/599 |
| 5,345,171 | 9/1994 | Simmons et al. | 324/166 |

Primary Examiner—William M. Shoop, Jr.
Assistant Examiner—Brian Sircus
Attorney, Agent, or Firm—Mark A. Navarre

[57] ABSTRACT

A traction motor controller has a motor feedback employing motor-driven encoders producing signals in quadrature having a phase depending on motor direction and frequency according to motor speed. A logic encoder develops a single signal comprising a pulse train having a frequency dependent on motor speed and either of two amplitudes dependent on motor direction. A decoder at the controller has a circuit for producing a pulsed output at a frequency according to the encoded signal to indicate motor speed. Another decoder circuit uses a comparator to discriminate between the two amplitudes. The higher amplitude signal causes comparator output pulses which are converted to a steady state signal by a flip-flop which is clocked by delayed motor speed pulses.

12 Claims, 3 Drawing Sheets

METHOD AND APPARATUS FOR ONE WIRE MOTOR SPEED AND DIRECTION DECODING

FIELD OF THE INVENTION

This invention relates to motor control systems and particularly to a method and apparatus for communication of motor speed and direction within a system.

BACKGROUND OF THE INVENTION

It is sometimes desirable to control an electric motor from a location spaced from the motor. In an electric vehicle, for example, an induction traction motor is driven from a battery supply via a power inverter which must be controlled to afford the desired motor speed and direction of rotation. The controller is a microprocessor based module for controlling the motor via the power inverter. A harness comprises wiring necessary for sending control commands to the power inverter. Feedback of motor speed and direction information is necessary input to the controller, and suitable feedback wiring is also part of the harness. To minimize the expense and the complexity of the harness it is desirable to minimize the number of harness wires; thus reducing the feedback wiring is a worthy objective. The benefit of fewer wire is mainly in the relaxed requirement for input and output pins on the controller.

SUMMARY OF THE INVENTION

It is therefore an object of the invention to minimize the feedback wiring in a motor control. Especially it is an object to afford such feedback using only a single wire. It is a further object of the invention to decode motor direction and speed information carried in encoded form on a single feedback wire.

A traction motor for an electric vehicle comprises an induction motor supplied by a power inverter module. The power inverter includes a bias and control assembly and a motor driver which translates controller commands into motor current. A controller connected to the power inverter by a wiring harness receives motor speed and direction over one feedback wire and sends motor control commands back to the power inverter. Encoding logic at the power inverter combines motor speed and direction information into one signal by producing a pulsed voltage having frequency proportional to motor speed and having either of two different amplitudes, one for each direction of rotation.

A decoding logic circuit at the controller separates the two types of information. In a first circuit a comparator has its reference voltage at a level between the two signal amplitudes to discriminate between then. The lower amplitude voltage does not trigger a comparator pulsed output but the higher amplitude voltage causes the output to switch periodically, according to the signal frequency, to generate a square wave output signal. This is converted to a positive steady state signal indicative of the higher amplitude signal and thus of the corresponding direction of rotation. Then a zero steady state signal indicates the opposite direction of rotation. In a second circuit a comparator senses signals of both amplitudes and outputs a pulse train having a frequency equal to the signal frequency and thus proportional to the motor speed.

The pulse train indicating speed is useful in the conversion of the square wave signal to a steady state signal. The square wave in the first circuit is coupled to the data input of a flip-flop. The pulse train of the second circuit is delayed a small amount and is applied to the clock port of the flip-flop. Then upon each rising edge of the delayed pulse train the high value of the square wave is present and is latched to the flip-flop output, thereby creating a continuous high output so long as the square wave exists. When the square wave ends due to change of motor direction, the low comparator output is then latched through the flip-flop to produce the steady state low signal.

BRIEF DESCRIPTION OF THE DRAWINGS

The above and other advantages of the invention will become more apparent from the following description taken in conjunction with the accompanying drawings wherein like references refer to like parts and wherein:

FIG. 4A depicts the output signal for reverse motor direction, and FIG. 4B depicts the output signal for forward motor direction.

DESCRIPTION OF THE INVENTION

Figure 1:
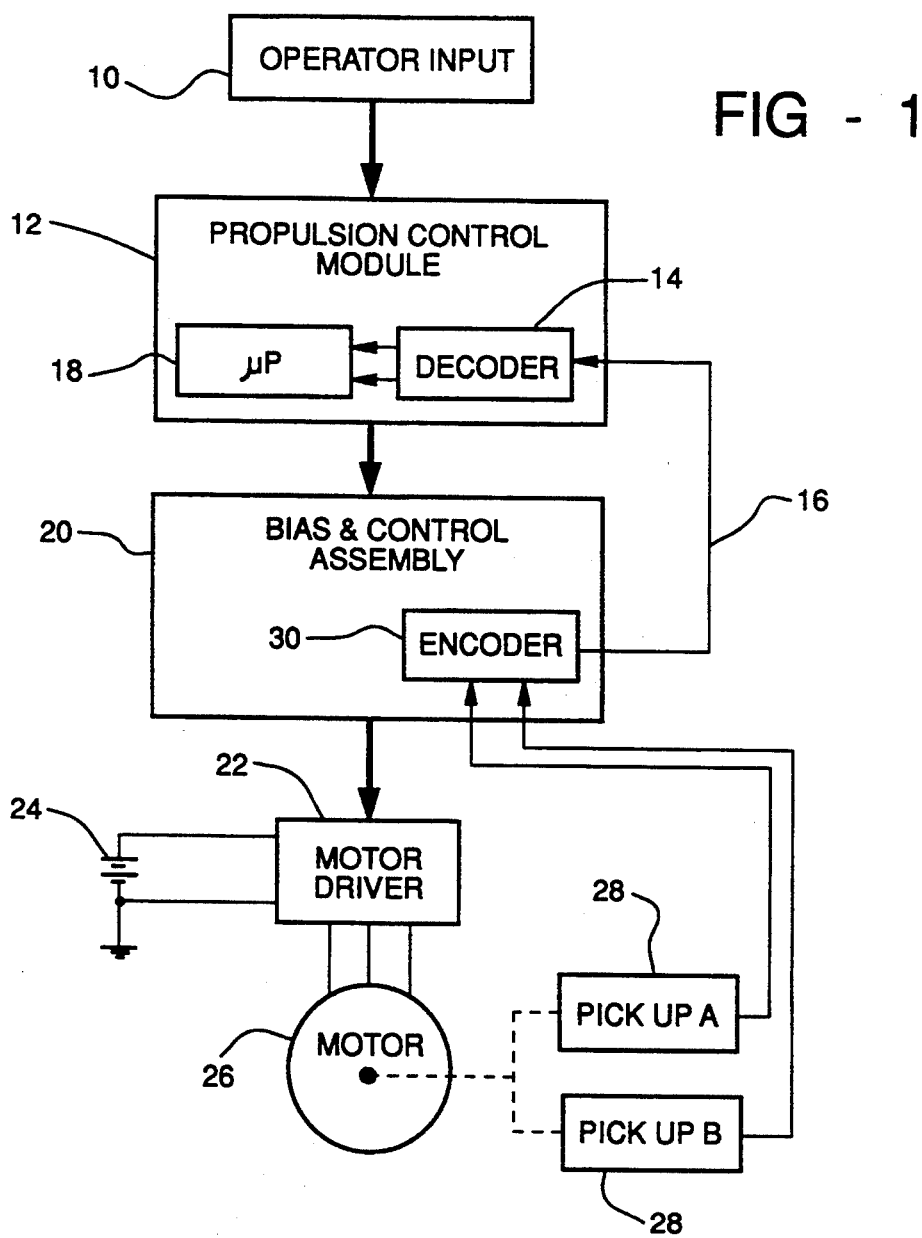
FIG. 1 is a block diagram of a motor control system including a motor speed and direction decoding circuit according to the invention.

A traction motor control circuit for an electric vehicle is shown in FIG. 1. An operator input 10 such as accelerator pedal position and direction selection is coupled to a propulsion control module 12 which is a microprocessor based controller. The control module includes a decoder 14 which receives a coded signal on line 16 and provides motor direction and speed information to the microprocessor 18. The control module 12 sends motor control signals to a bias and control assembly 20 which interprets the motor control signals and sends appropriate switching signals to the transistors of a motor driver 22. The motor driver, in turn, receives electrical power from a battery 24 and develops a three phase power output to drive an induction motor 26. A pair of shaft rotation encoders or pickups 28 produce a pair of output signals A and B in quadrature, which are coupled to an encoder 30 located in the bias and control assembly thereby affording feedback of motor parameters. Each signal A and B has a frequency proportional to the motor speed, and the relative phase of the signals depends on the direction of motor rotation which corresponds to forward and reverse movement of the vehicle. The encoder 30 produces a signal which combines the motor speed and direction information and sends it to the decoder 14 by a single wire which is line 16.

Figure 2:
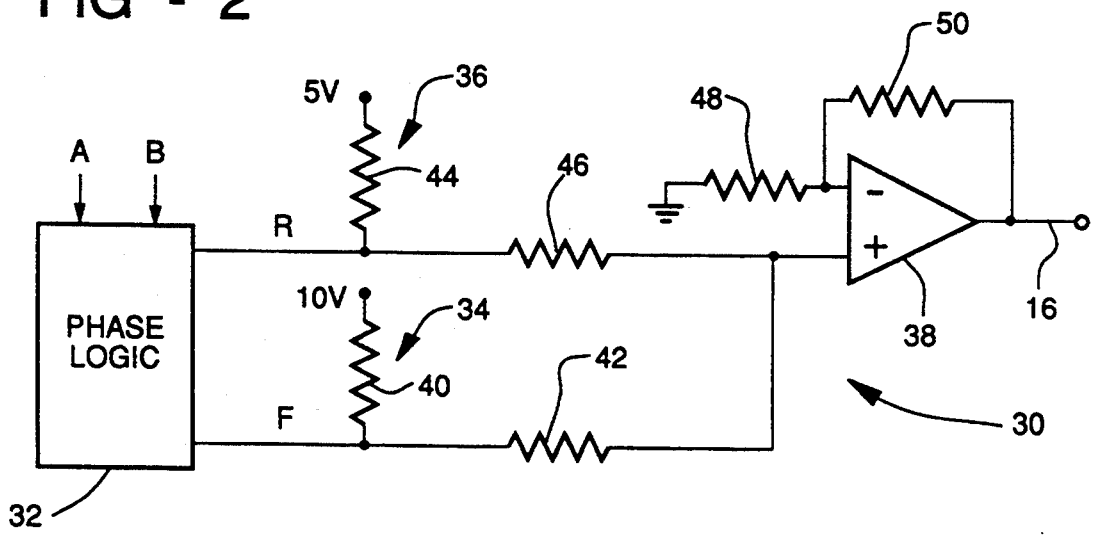
FIG. 2 is a circuit diagram of an encoder circuit of FIG. 1 for providing an encoded signal to the decoder circuit.

As shown in FIG. 2, the encoder 30 comprises a phase logic circuit 32, bias circuits 34 and 36, and a non-inverting buffer 38. The phase logic circuit may be executed in a number of ways. For example, the quadrature signals A and B are pulse signals which are out of phase but both have the same frequency. They are compared and the leading phase is transmitted to a bias circuit 34 or 36 while the other signal is blocked. One way of comparing the phase is to couple signal A to the data input of a D flip-flop and the signal B to the clock input. If phase A is leading a high signal will be clocked through to the Q output and a low or zero signal will appear on the Q-not output of the flip-flop. If phase B is leading, the opposite occurs. By connecting signals A and Q to inputs of an AND gate and signal B and Q-not to another AND gate, the leading signal is transmitted and the other signal is blocked. Thus the signal A becomes the forward signal F and the signal B becomes the reverse signal R, and the two are mutually exclusive.

Figure 4A:
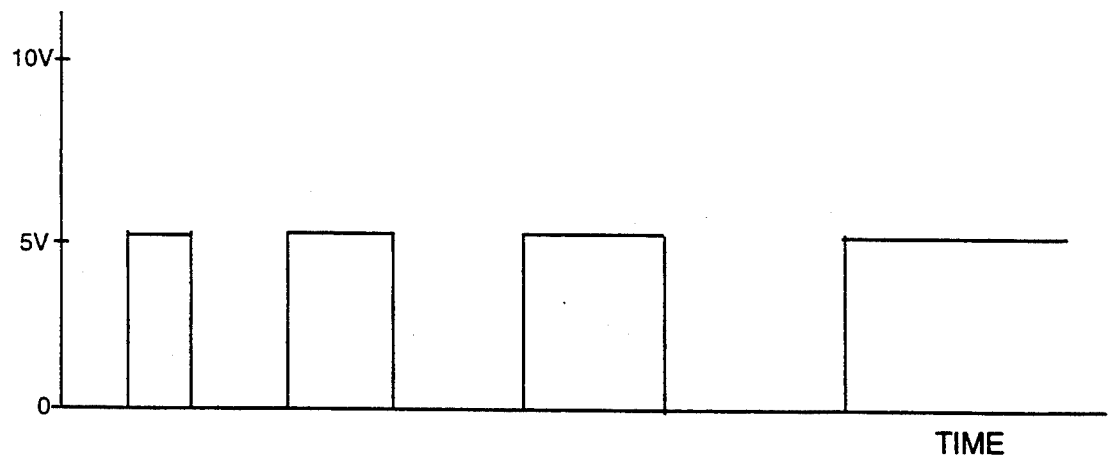
FIGS. 4A and 4B depict representative pulse output signals of the encoder circuit shown in FIG. 2.
Figure 4B:
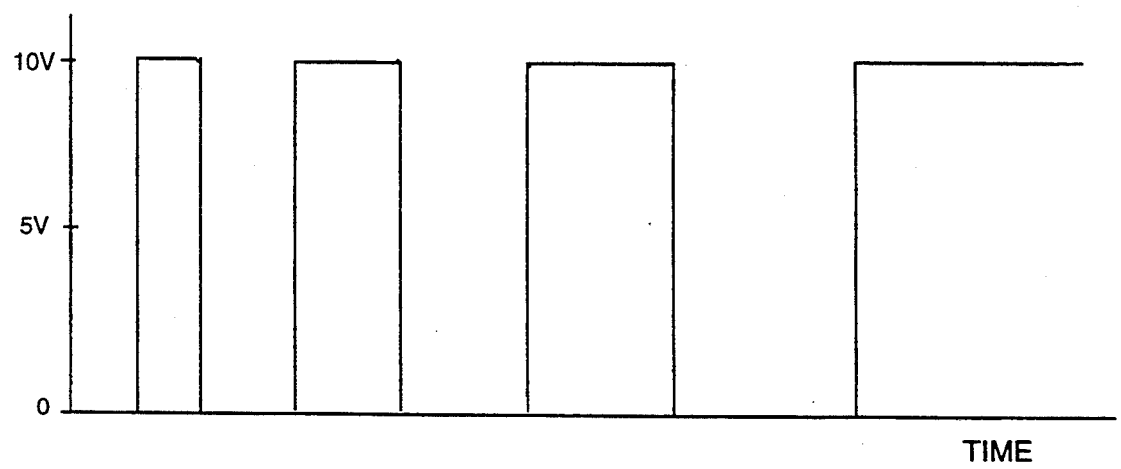

The bias circuit 34 comprises a 10 volt source coupled through a resistor 40 to the line carrying the forward signal F to thereby bias the amplitude of the pulses to 10 volts, and an input resistor 42 coupling the signal F to the positive input of the buffer 38. The bias circuit 36 comprises a 5 volt source coupled through a resistor 44 to the line carrying the reverse signal R to thereby bias the amplitude of the pulses to 5 volts, and an input resistor 46 coupling the signal R to the positive input of the buffer 38. The buffer 38 has an input resistor 48 between the inverting pin and ground and a feedback resistor 50 to the same pin. The input resistors 42 and 46 and 48 and the feedback resistor are preferably the same value. Thus when the signal A is leading the forward signal F is activated and 10 volt pulses are output on line 16 at a frequency determined by motor speed, as illustrated by the pulse train of FIG. 4B; and when signal B is leading the reverse signal R is activated and the output comprises 5 volt pulses at a frequency determined by motor speed, as illustrated by the pulse train of FIG. 4A. In both FIGS. 4A and 4B, the pulses are depicted as decreasing in frequency, representing a motor speed decreasing with respect to time.

Figure 3:
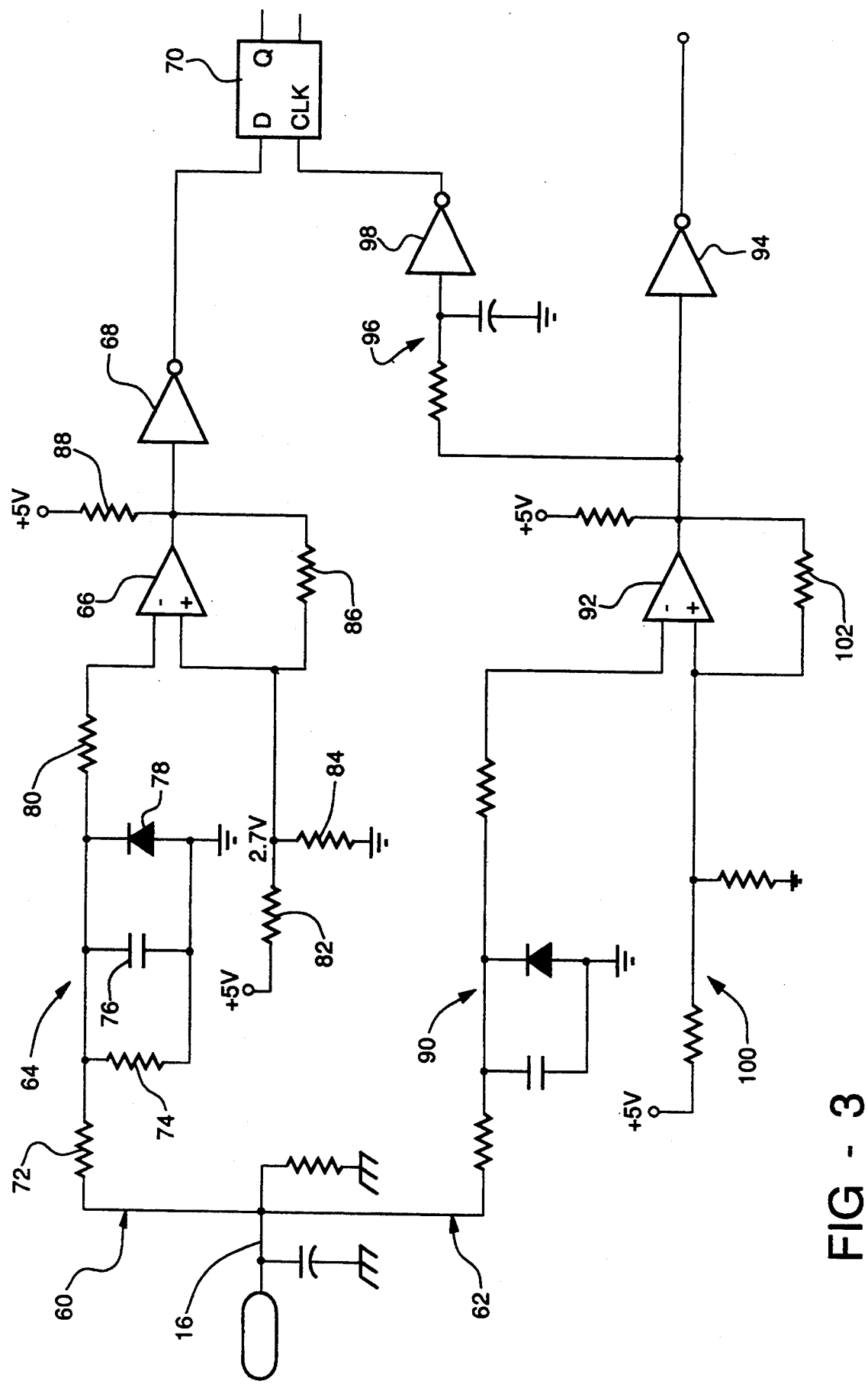
FIG. 3 is a circuit diagram of the decoder circuit of FIG. 1.

The decoder 14 receives the encoded signal on line 16 and determines the motor speed and direction. As shown in FIG. 3, the decoder comprises a first circuit 60 for direction decoding and a second circuit 62 for speed decoding. The second circuit also assists in the operation of the first circuit by supplying a timing signal. The encoded signal is fed to both of the circuits for simultaneous processing. The first circuit comprises a voltage divider and filtering circuit 64, a comparator 66, a schmidt trigger 68 and a D flip-flop 70. The voltage divider comprises a resistor 72 and a resistor 74 between the input and ground to scale down the voltage of the input for presentation to the inverting input of the comparator 66. A low pass filter including a capacitor 76 in parallel with a diode 78 and a resistor 80 at the comparator input reduces noise on the line. A reference voltage is determined by a 5 volt source, dividing resistors 82 and 84 and fed to the positive input of the comparator. The reference voltage is set at a threshold value effectively between the high and low pulse amplitudes so that the comparator will respond only to the higher voltage pulses, thereby discriminating between the forward and reverse signal. In one specific circuit, the 10 volt pulse is reduced to 4.28 volts, the 5 volt pulse is reduced to 2.14 volts, and a threshold of 2.7 volts is used. The comparator 66 has a feedback resistor 86 which produces a hysteresis of 0.58 volt centered around the 2.7 volt threshold to provide further noise immunity. The comparator output is biased to 5 volts through a resistor 88 and is fed to a schmidt trigger for inversion, and the result is fed to the data input of the flip-flop 70. The flip-flop is clocked by a delayed pulse signal to be described.

In operation, when the first circuit input is a forward signal F comprising a 0-10 volt pulses train, the pulses arriving at the comparator 66 input are large enough to trigger the comparator to produce a 0-5 volt output which is phased opposite the input pulse, and the schmidt trigger 68 inverts that signal so that it is substantially in phase with the signal F, except for a small circuit delay. The flip-flop clocks the 5 volt pulses through to produce a steady state 5 volt output, which is indicative of the forward direction of motor rotation. On the other hand when the first circuit input is a reverse signal R comprising a 0-5 volt pulse train, the signal applied to the comparator is too small to trigger the comparator and its output is a continuous 5 volts. The schmidt trigger 68 converts that to 0 volts which is clocked through the flip-flop 70 and the steady state output is 0 volts, indicative of reverse motor rotation.

The second circuit 62 has only to produce pulses of the same frequency as the input pulses F and R for the speed indication, and a phase shifted pulse train for clocking the flip-flop 70. The second circuit comprises a filter 90, a comparator 92, an output schmidt trigger 94, an RC delay circuit 96 at the comparator output to produce the delayed pulse train, and a schmidt trigger 98 to square up the slow edge caused by RC filter 96 and to correct the phase for proper timing. Due to the time delay, the rising edges of the delayed pulse train are applied to the clock input of the flip-flop 70 just after the rising edges of the pulses applied to the data input. The time delay must be longer than the maximum delay through the first circuit 60 minus the minimum delay through the second circuit 62. A reference voltage of 2.5 volts for the positive input of the comparator 92 is set by a 5 volt source and a voltage divider 100. Hysteresis of 1 volt is provided by a comparator feedback resistor 102. Since both F and R input signal pulses are larger than the reference voltage, either pulse train will cause comparator switching to yield a pulsed comparator output having the same frequency as the input F or R, thus affording a motor speed indication.

It will thus be seen that the encoding and decoding scheme permits both motor speed and direction information to be transmitted by one wire and, more importantly, to require only one pin of the propulsion control module for the input of both parameters.

The embodiments of the invention in which an exclusive property or privilege is claimed are defined as follows:

1. A motor control system having a bi-directional variable speed motor, a controller for controlling motor operation, and means for supplying the controller electrically encoded motor speed and direction data, the improvement wherein:
   the speed and direction data are electrically encoded on a single alternating voltage signal, said signal having an amplitude parameter dependent on said direction data, and a frequency parameter dependent on said speed data;
   the controller includes circuit means for sensing the amplitude parameter of said voltage signal to output a motor direction signal; and
   the controller includes circuit means for sensing the frequency parameter of said voltage signal to output a motor speed signal.

2. The improvement of claim 1 wherein:
   the motor speed is encoded as the frequency of a voltage signal and the direction is encoded as amplitude of the voltage signal;
   the controller having a decoder comprising a first and second circuit;

the first circuit coupled to the voltage signal and responsive to amplitude of the signal for determining motor direction;

the second circuit coupled to the voltage signal and responsive to frequency of the signal for determining motor speed.

3. The improvement of claim 2 wherein the signal amplitude is above or below a threshold in dependence on the motor direction; and the first circuit includes a comparator receiving the signal and having a reference voltage at the threshold, whereby the comparator produces a pulsed output only when the signal amplitude goes above the threshold to thereby indicate motor direction.

4. In a motor control system having a bi-directional variable speed motor, a controller for controlling the motor operation, a feedback system for supplying motor speed and direction data to the controller comprising:

means responsive to the motor for generating a single alternating voltage signal encoding motor speed as the frequency of said signal and motor direction as the amplitude of said signal; and the controller including first and second circuits coupled to the voltage signal, said first circuit being responsive to the amplitude of the signal for determining motor direction, and the second circuit being responsive to the frequency of the signal for determining motor speed.

5. The invention as defined in claim 4 wherein the signal amplitude is above or below a threshold in dependence on the motor direction; and the first circuit includes a comparator receiving the signal and having a reference voltage at the threshold, whereby the comparator produces a pulsed output only when the signal amplitude goes above the threshold to thereby indicate motor direction.

6. The invention as defined in claim 5 wherein the first circuit includes latch means responsive to the comparator output to produce a steady state output having a level dependent on motor direction.

7. The invention as defined in claim 5 wherein:

the second circuit includes means for generating a delayed pulse train having the same frequency as the signal; and the first circuit includes latch means responsive to the comparator output to produce a steady state output having a level dependent on motor direction, the latch means comprising a flip-flop clocked by the delayed pulse train.

8. The invention as defined in claim 5 wherein:

the second circuit includes means for producing a pulse train having the same frequency and phase as the signal, and delay means for producing a delayed pulse train; and the first circuit includes a flip-flop having a data input and a clock input, the comparator output being connected to the data input, and means for applying the delayed pulse train to the clock input thereby producing a constant flip-flop output at one level when the signal amplitude is above the threshold and at another level when the signal amplitude is below the threshold.

9. In a motor control system having a bi-directional variable speed motor, a controller for controlling motor operation, and means for supplying motor speed and direction data to the controller, a method of communicating data comprising the steps of:

encoding on a single electrical signal an amplitude parameter which contains the direction data and a frequency parameter which contains the speed data;

transmitting the signal to the controller; and decoding the transmitted signal by developing a speed signal from the frequency parameter, and developing a direction signal from the amplitude parameter.

10. The invention as defined in claim 9 wherein the amplitude of the signal is above a threshold for one motor direction and below the threshold for the other direction, and the step of developing a direction signal comprises:

comparing the signal amplitude to the threshold; and producing a first output when the signal amplitude is above the threshold and a second output when the signal amplitude is below the threshold, whereby the first and second outputs are indicative of respective motor directions.

11. The invention as defined in claim 9 wherein the amplitude of the signal is above a threshold for a first motor direction and below the threshold for the second motor direction, and the step of developing a direction signal comprises:

comparing the signal amplitude to the threshold to produce a continuous output when the amplitude is below the threshold and a pulsed output when the amplitude is above the threshold; and converting the pulsed output to a continuous signal at one level indicative of the first motor direction, and converting the continuous output to a continuous signal at another level indicative of the second motor direction.

12. The invention as defined in claim 9 wherein the step of developing a speed signal from the signal frequency comprises generating a pulse train having a frequency equal to the frequency of the signal whereby the pulse train frequency is indicative of motor speed.

* * * * *